INVENTOR.
DAVID M. MORGENSTERN

June 26, 1945. D. M. MORGENSTERN 2,379,028
DRILLING DEVICE
Filed July 14, 1943 2 Sheets-Sheet 2

INVENTOR.
DAVID M. MORGENSTERN
BY
Hull + West
ATTORNEYS

Patented June 26, 1945

2,379,028

UNITED STATES PATENT OFFICE 2,379,028

DRILLING DEVICE

David M. Morgenstern, Cleveland, Ohio, assignor to The Electroline Mfg. Co., Cleveland, Ohio, a corporation of Ohio Application July 14, 1943, Serial No. 494,661

4 Claims. (Cl. 77—64)

This invention relates to drilling devices, and as herein disclosed, it is constructed and used for drilling holes in the heads, especially through the planes of the peripheral faces of polyhedral heads, of screws, bolts or the like; and it includes a drill press that is standard in all respects excepting the control, and a jig for holding and positioning the work in operative relation to the drill.

The main purpose of the invention is to provide a drilling device that is semi-automatic in its operation, being rendered so by the inclusion of power means, such as pressure fluid and electrical means, to the end that all the operator is required to do is insert a piece of work and then close a switch, as by pushing a button, and a given sequence of steps will be automatically performed in a cycle of operation; and upon the conclusion of the cycle, the device will stop. Because of this semi-automatic characteristic, a number of the devices may be attended and kept in constant operation by one person, the cycles of the different devices being staggered, so to speak, in order that the operator may give his attention to the loading and starting of the respective devices in succession.

Other objects are to provide a jig for use with a drill press or like machine that is relatively small and compact so that it may be easily accommodated on the table of such a press or machine; to provide a jig that is simple of construction and relatively inexpensive, and that is durable and is not likely to get out of order.

A further object of the invention is to combine a jig of the above character with suitable drilling mechanism which desirably consists of a standard drill press, and to include a control system, preferably electrical and pressure fluid, desirably pneumatic, that will govern and coordinate the operations of the drilling mechanism and the jig so that, upon the device being loaded and set in operation, it will perform a complete cycle and then stop without further attention on the part of the operator. The finished product is discharged when the operator manipulates the jig to insert a fresh piece of work.

Figure 1:
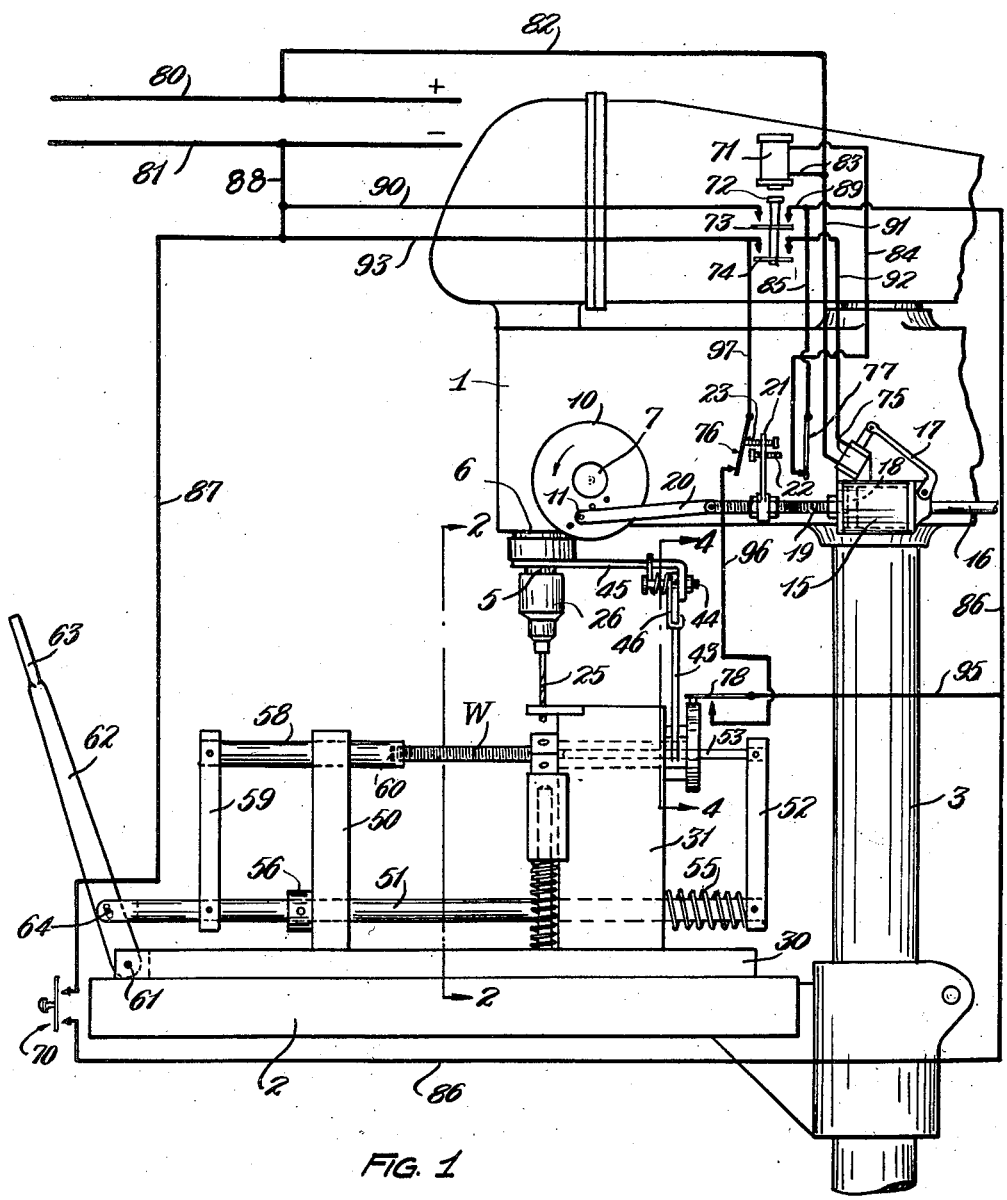
Figure 2:
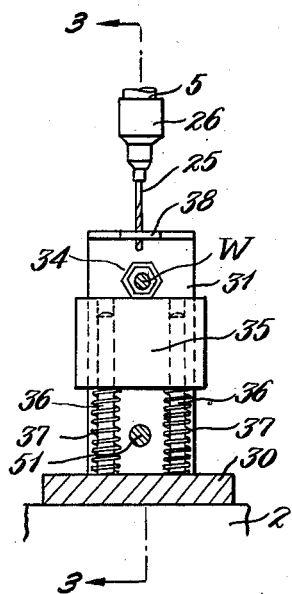
Figure 3:
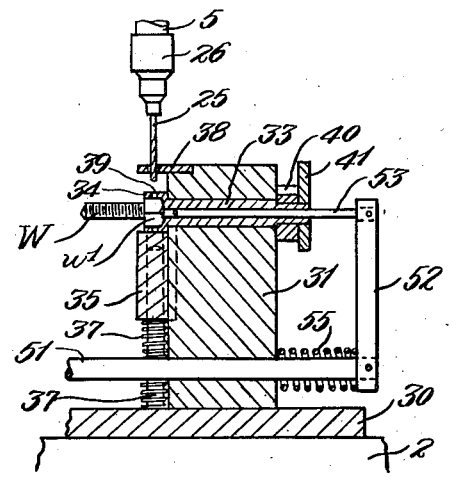
Figure 4:
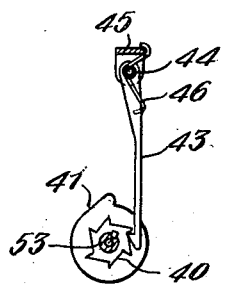
Figure 5:
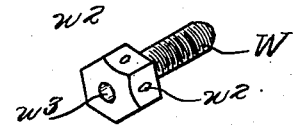

The foregoing objects, with others hereinafter appearing, are attained in the embodiment of the invention illustrated in the accompanying drawings wherein Fig. 1 is a more or less schematic side elevational view of the device, with the electrical means and circuits diagrammatically shown, and with the jig drawn to an exaggerated scale relative to that of the drill press so as to more clearly reveal the structural details of the former; Fig. 2 is a sectional view on the line 2—2 of Fig. 1; Fig. 3 is a fragmentary central vertical section through the jig in a plane parallel to that of Fig. 1, the view also including the drill and chuck; Fig. 4 is a sectional detail on the line 4—4 of Fig. 1, and Fig. 5 is a perspective view showing a screw or bolt whose hexagonal head has been drilled by means of the device.

Proceeding now with a detailed description of the invention by the use of reference characters, like ones of which are applied to corresponding parts throughout the several views of the drawings, 1 designates the head of a drill press, 2 the table, and 3 a column by which the head and table are supported in properly spaced relation to each other. This drill press is of a standard and well known type, and its spindle 5, while being constantly rotated, is adapted to be vertically reciprocated as the part 6, wherein it is journaled, is raised and lowered in the customary manner by the oscillation of a shaft 7, which has the usual gear and rack connection (not shown) with said part 6. Fastened to the shaft 7 is a disk 10 having provision for adjustably connecting to it at different distances from its center a crank pin 11; and when the disk, and consequently the shaft 7, is rotated in a counterclockwise direction, as indicated by the arrow in Fig. 1, the drill will be fed downwardly or projected and caused to perform its operation upon the work, after which it will be raised or retracted to the position shown in Fig. 1 by a reverse movement of the shaft 7.

This operation of projecting and retracting the drill is automatically accomplished in the present instance by pressure fluid means including a cylinder 15 to which the pressure fluid is delivered from a suitable source (not shown) through a pipe 16, under the control of a valve whose operating lever is designated 17. As pressure fluid devices of this sort are so well known, detailed illustration beyond that appearing in the drawings is deemed unnecessary. A piston 18 operates within the cylinder 15 and it should be explained that when the lever 17 is swung downwardly it will cause the piston 18 to move from the front or left hand end of the cylinder, as viewed in the drawings, to the right hand end or rear thereof, and when it is moved up to the position shown, it will cause the piston to return to the position shown in dotted lines. The lever is biased toward raised position, as by a spring. 19 is the piston rod that is connected by means of a link or pitman 20 to the crank pin 11. Mounted upon and desirably adjustable along the piston rod 19 is an arm 21 that carries adjustable trippers 22 and 23 for a purpose that will hereinafter appear.

The drill 25 is connected by the usual chuck 26 to the spindle 5. Mounted upon the table 2 of the drill press is the jig by which the work, designated W, is supported in operative relation to the drill 25. The base 30 of the jig is suitably secured to the table 2, and rising therefrom, slightly to the rear of the vertical plane of the drill 25, is a housing 31. Journaled in a bore that extends from front to rear of the housing near the top thereof is a hollow shaft 33 that carries, at its forward end, a socketed head or receptacle 34 for the reception of a part of the work W, the latter, in the present instance, consisting of a screw or bolt having a hexagonal head $w'$. The socket of the head or receptacle 34 is of a size and shape to properly receive the head of the screw or bolt and hold it against relative turning, and the exterior of the head or receptacle 34 is desirably of the same shape so as to provide six flat faces wherewith positioning and holding means is adapted to engage. In the present embodiment, the means just referred to consists of a block 35 that is slidable along the front of the housing 31 and is guided upon pins 36 that rise from the base 30 and occupy vertical bores in said block. Surrounding said pins are relatively stiff springs 37 that are compressed between the base and the under face of the block 35. A drill guide 38 is mounted on the housing 31 at the front top corner thereof. Each of the six side walls of the receptacle 34 is provided with an aperture 39 through which the drill has access to the corresponding face of the hexagonal head of the screw or bolt that constitutes the work W.

Fastened to the rear end of the hollow shaft 33, where it projects beyond the corresponding side of the housing 31, is a ratchet 40 and a cam 41, the ratchet having the same number of teeth as the bolt or screw head has faces. Cooperating with the ratchet 40 is the hook-like lower end of a pawl 43 that is pivotally supported upon a pin 44, carried by the downturned rear end of a bracket 45 that is fastened to and movable with the part 6 of the drill press, the pawl thus being caused to reciprocate in unison with the drill 25. The pawl is yieldingly held against the ratchet 40 by a spring 46 that is coiled about the pin 44 and has one of its ends engaged with the bracket and its other end with the pawl. The purpose of the cam 41 will later appear.

Mounted in aligned bores in the housing 31 and in a standard 50 that rises from the base 30 toward the front end thereof is a rod 51 to the rear end of which is fastened the lower end of a bar 52. An ejector pin 53 is secured to the upper end of the bar 52 and occupies the bore of the tubular shaft 33. A helical spring 55 surrounds the rear end of the rod 51 and is compressed between the housing 31 and the bar 52. Said spring tends to urge the rod in a direction to engage a stop 56, that is secured to the rod, with the front of the standard 50. Guided within a bore near the top of the standard 50 is a plunger 58 that is rigidly connected, by a bar 59, to the rod 50. The rear end of the plunger is provided with a recess 60 for the reception of the end of the screw or bolt which constitutes the work W. Pivotally connected at 61 to the front end of the base 30 is a lever 62 which terminates at its upper end in a finger piece 63. The front end of the rod 51 is connected by a pivot member 64 to the lever 62.

The control system through which a cycle of operation of the device is initiated, and by means of which the various actions involved in said cycle are properly coordinated, will now be described.

Shown diagrammatically in Fig. 1, in association with the above described structure, are a manually operable switch 70, desirably of the push button type, that is located in convenient reach of the operator; a relay 71, whose armature is designated 72, and the function of which is to operate circuit closers 73 and 74; an actuator 75 in the form of a solenoid whose movable core is articulated to the free end of the valve lever 17 of the pressure fluid cylinder 15; two limit switches 76 and 77, and a circuit breaker 78 that is held open by the previously mentioned cam 41 when the latter is in the position it occupies between cycles of operation.

The circuits of the control system will be described as I set forth below the operation of the drilling device. The operator, by drawing forward the lever 62, retracts the plunger 58, thereby to release the work W, the head $w'$ of which is dislodged from the receptacle 34 by the ejector pin 53, the latter being moved in unison with the plunger 58 by reason of its connection therewith through the bars 52 and 59 and the rod 51, the manual actuation of the parts in question being in opposition to the spring 55. The operator, while holding forward on the lever 62, engages the end of another bolt or screw within the recess 60 of the plunger 58 and, relaxing his hold on the lever 62, guides the head of the bolt or screw into the receptacle 34. The spring 55 now serves to hold the work securely within the work holder during the ensuing cycle of operation.

The operator next closes the switch 70 which causes current to flow from the source—represented, in the present instance, by conductors 80 and 81—through wires 82 and 83 to the winding of the relay 71. From the relay the current flows on through the wire 84, limit switch 77, wires 85 and 86, through the presently closed switch 70 and wires 87 and 88 back to the source. This results in the energization of the relay 71 and the attraction of its armature 72, thereby to place in effective condition the circuit closers 73 and 74. Now, current will flow from the wire 85, through wire 89, circuit closer 73, wire 90 and the previously mentioned wire 88 to the source, wherefore the push button switch 70 may be released and allowed to open. The placing of the other circuit closer 74 in effective condition by the energization of the relay 71 establishes a path from the wire 82 through a wire 91, the winding of the solenoid 75, a wire 92, the circuit closer 74, and a wire 93 and previously mentioned wire 88, to the source. The energization of the solenoid 75 causes a retraction of its core which swings the valve lever 17 downwardly and this action, as previously explained, introduces pressure fluid to the front end of the cylinder 15 which causes the piston 18 to move rearwardly, retracting the rod 19 and, through the link 20, rotating the shaft 7 in a direction to project the drill 25 and cause it to operate upon the work, that is, to drill a hole radially of the head $w'$ to near the center of the latter. As will presently be seen, this is repeated until all sides of the head have been drilled. The two radial holes appearing in Fig. 5 are designated $w^2$, and it may be explained that, after all radial holes have been drilled, an axial recess $w^3$ is bored into the top of the head by suitable means in order to open up the inner ends of all of the radial holes $w^2$. By drilling the holes and said recess in the manner and sequence described, burrs are avoided and the life of the drill is prolonged for reasons apparent to those skilled in the art.

It will be remembered that the pawl 43 moves downward in unison with the drill 25 so as to be in a position to engage the next tooth of the ratchet 40 when subsequently elevated. As the piston 18 reaches the rear end of its stroke (which may be short of the rear end of the cylinder 15 according to the adjustment of the trippers 22 and 23), the tripper 22 engages and opens the limit switch 77, thereby breaking the circuit through the winding of the relay 71, causing the deenergization of the relay and the movement of its armature in a direction to open the circuit closers 73 and 74. The opening of the latter circuit closer breaks the circuit that includes the winding of the solenoid 75, whereupon the valve lever 17 will be released and allowed to return to its normal position which shifts the pressure fluid supply to the rear side of the piston 18 and causes the piston to be moved forwardly.

The forward movement of the piston rotates the shaft 7 in a direction to raise the drill 25 and to lift the pawl 43 thereby to impart a sixth of a rotation to the ratchet 40, as well as to the cam 41, and a like movement, through the shaft 33, to the receptacle 34 of the work holder, thereby to present the next face of the head w' to the drill. This action causes a slight depression of the block 35 against the action of the springs 37 as the corner of the receptacle 34 swings through the low part of its arcuate path. Now, as the springs thrust the block upward, it will, by its cooperation with the flat side of the receptacle 34, locate said receptacle in proper position and hold it in such position during the ensuing drilling operation. This action, it must be remembered, caused the high point of the cam 41 to withdraw from the circuit breaker 78, permitting the same to close; and it remains closed until the completion of a cycle of operation, when the high point of the cam again opens the circuit breaker, as will presently appear.

The forward movement of the piston 18 ends with the engagement of the tripper 23 with the limit switch 76 and a consequential closing of the circuit at this point, it being remembered that under the conditions now prevailing the circuit breaker 78 is in closed position. With said limit switch 76 closed, current will flow from the source through the wires 82 and 83 to the winding of the relay 71 and thence, through the wire 84, limit switch 77, wires 85 and 86, a wire 95, the circuit breaker 78, a wire 96, the limit switch 76, a wire 97, and wires 93 and 88, back to the source. The relay thus being energized, the circuit closers 73 and 74 will be rendered effective to close the circuits controlled thereby, and another drilling operation will be initiated.

As already brought out, when the circuit closer 73 is in effective condition it maintains the flow of current through the relay winding, and when the circuit closer 74 is effective, it causes the energization of the solenoid 75, thereby to actuate the valve of the cylinder 15 and cause the piston 18 to move to the rear. The rearward movement of the piston, it will be remembered, concludes with the opening of the limit switch 77 by the tripper 22.

From the foregoing it is apparent that, as long as the circuit breaker 78 remains closed, the limit switch 76 will automatically initiate a drilling operation at the conclusion of each forward stroke of the piston 18, serving the same purpose under these circumstances as the manual switch 70 does at the start of a cycle. Consequently, one drilling operation will succeed another until all faces of the head w' of the work have been drilled and the high point of the cam 41 returns to its initial position and actuates circuit breaker 78 to open the circuit that includes the limit switch 76.

At the conclusion of a cycle, the operator pulls forwardly on the lever 62 in order to retract the plunger 58 and disengage its inner end from the adjacent end of the work W, and as the work is thus released by the plunger, the ejector pin 53 engages the head w' and dislodges it from the the receptacle 34. The operator now manipulates ward in opposition to the spring 55, the operator inserts the end of a fresh piece of work in the recess 60 of the plunger 58 and then releases the lever to allow the spring to shift the movable parts rearwardly and project the head w' into the receptacle 34. The operator now manipulates the switch 70 to start another cycle of operation and the same will proceed as above described until concluded by the opening of the circuit breaker 78 by the cam 41.

Having thus described my invention, what I claim is:

1. In combination with drilling mechanism incorporating a part that is reciprocable with the drill in the projection and retraction of the latter, a jig for supporting a piece of work in operative relation to the drill, the same comprising a housing, a shaft journaled in said housing, a work holding receptacle on one end of the shaft, the same having circumferentially spaced positioning parts, a ratchet rotatable with the shaft, a pawl for cooperation with the ratchet that is movable with the aforesaid reciprocable part, means for retaining a piece of work in the receptacle, and yielding means arranged to engage said positioning parts successively for positioning and holding the receptacle during the drilling operations.

2. In combination with drilling mechanism incorporating a part that is reciprocable with the drill in the projection and retraction of the latter, a jig for sustaining a piece of work in operative relation to the drill, the same comprising a housing, a tubular shaft journaled therein, a receptacle on one end of the shaft, a ratchet on the shaft, a pawl carried by the aforesaid reciprocable part for cooperation with the ratchet thereby to turn the shaft and present a different part of the work to the drill after each drilling operation, a plunger slidably supported in axial alignment with said shaft in opposed relation to the receptacle and wherewith a part of the work is engaged when another part thereof occupies the receptacle, an ejector pin reciprocable in the tubular shaft, a structure rigidly tying together said plunger and the ejector pin, means tending to move the structure in a direction to retract the ejector pin and extend the plunger toward the receptacle, and manually operable means for moving the structure in the opposite direction.

3. In combination with drilling mechanism incorporating a part that is reciprocable with the drill in the projection and retraction of the latter, a jig for sustaining a piece of work in operative relation to the drill, the same comprising a housing, a tubular shaft journaled therein, a receptacle on one end of the shaft, a ratchet on the shaft, a pawl carried by the aforesaid reciprocable part for cooperation with the ratchet thereby to turn the shaft and present a different part of the work to the drill after each drilling operation, a plunger slidably supported in axial alignment with said shaft in opposed relation to the receptacle and wherewith a part of the work is engaged when another part thereof occupies the receptacle, an ejector pin reciprocable in the tubular shaft, a structure rigidly tying together said plunger and the ejector pin, means tending to move the structure in a direction to retract the ejector pin and extend the plunger toward the receptacle, and manually operable means for moving the structure in the opposite direction, the receptacle having a series of peripheral positioning faces, and a yieldingly supported block for contact with said faces for holding the receptacle in its different positions.

4. A jig for sustaining a piece of work in a plurality of operative positions with respect to the drill of a drill press, the same comprising a base, a housing rising therefrom and having parallel bores spaced one above the other, a tubular shaft journaled in the upper bore, a polyhedral receptacle carried by the shaft on one side of the housing, a ratchet secured to the shaft rearwardly of the housing and having the same number of teeth as the receptacle has peripheral faces, each of the peripheral faces of the receptacle being provided with a passage for the drill, a pawl reciprocable with the drill for cooperation with the ratchet, guide means rising from the base forwardly of the housing, a block guided thereon for contact with the under side of the receptacle, spring means urging the block into contact with the receptacle, a rod reciprocable within the lower bore of the housing, a standard rising from the base in spaced relation to the front of the housing, the same having a bore through which said rod is slidable, the standard having a second bore in axial alignment with the aforesaid receptacle, a plunger guided within the last mentioned bore, a bar through which said plunger and the front portion of the aforesaid rod are rigidly tied together, an ejector pin guided within the tubular shaft, a second bar through which the same is rigidly connected with the rear end of the aforesaid rod, a spring urging the rod rearwardly, and means adjacent the front end of the rod for drawing it forwardly against the tension of said spring.

DAVID M. MORGENSTERN.